United States Patent
Keränen et al.

(10) Patent No.: US 10,728,346 B2
(45) Date of Patent: Jul. 28, 2020

(54) COMMUNICATION CONFIGURATIONS FOR A MACHINE DEVICE

(71) Applicant: Telefonaktiebolaget LM Ericsson (publ), Stockholm (SE)

(72) Inventors: Ari Keränen, Helsinki (FI); Jari Arkko, Kauniainen (FI); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 93 days.

(21) Appl. No.: 16/069,038

(22) PCT Filed: Feb. 9, 2016

(86) PCT No.: PCT/SE2016/050095
§ 371 (c)(1),
(2) Date: Jul. 10, 2018

(87) PCT Pub. No.: WO2017/138849
PCT Pub. Date: Aug. 17, 2017

(65) Prior Publication Data
US 2019/0058769 A1 Feb. 21, 2019

(51) Int. Cl.
*H04L 29/08* (2006.01)
*H04L 12/24* (2006.01)
(Continued)

(52) U.S. Cl.
CPC .......... *H04L 67/16* (2013.01); *H04L 41/0806* (2013.01); *H04L 41/0816* (2013.01);
(Continued)

(58) Field of Classification Search
CPC . H04L 67/16; H04L 41/0886; H04L 41/0806; H04L 41/0883; H04L 41/0816;
(Continued)

(56) References Cited

U.S. PATENT DOCUMENTS

2014/0286215 A1* 9/2014 Koc ............. H04W 24/04 370/311
2017/0046366 A1* 2/2017 Rahman ............. H04W 4/70

FOREIGN PATENT DOCUMENTS

EP 2018072 A1 11/2007
EP 2375849 A1 10/2011
(Continued)

OTHER PUBLICATIONS

Shelby, Z., et al., "CoRE Interfaces", Internet-Draft Dec. 11, 2013, pp. 1-25, IETF.
(Continued)

*Primary Examiner* — Curtis A Alia
(74) *Attorney, Agent, or Firm* — Coats + Bennett, PLLC

(57) ABSTRACT

A machine device (30) sends a report setting out the type of services it supports to a configuration determining device (26) associated with a communication network (10, 12), which configuration determining device 5 (26) in turn determines communication configuration suggestions for the communication of the machine device (30) in the communication network (10, 12) based on the supported type of services indicated in the report and provides the communication configuration suggestions for allowing at least some of them to be implemented for use in communication 10 performed by the machine device (30). The machine device (30) then communicates in the communication network using the communication configurations suggestions that have been implemented.

12 Claims, 5 Drawing Sheets

(51) Int. Cl.
*H04W 8/22* (2009.01)
*H04W 76/10* (2018.01)
*H04W 72/04* (2009.01)
*H04W 8/24* (2009.01)
*H04W 4/70* (2018.01)

(52) U.S. Cl.
CPC ...... *H04L 41/0883* (2013.01); *H04L 41/0886* (2013.01); *H04L 67/12* (2013.01); *H04W 8/22* (2013.01); *H04W 72/048* (2013.01); *H04W 72/0446* (2013.01); *H04W 76/10* (2018.02); *H04W 4/70* (2018.02); *H04W 8/245* (2013.01)

(58) Field of Classification Search
CPC ..... H04L 72/048; H04L 72/0446; H04L 4/70; H04W 76/10; H04W 76/12; H04W 8/22; H04W 8/245
See application file for complete search history.

(56) References Cited

FOREIGN PATENT DOCUMENTS

| | | |
|---|---|---|
| GB | 2513896 A | 11/2014 |
| WO | 2007079279 A2 | 7/2007 |

OTHER PUBLICATIONS

Shelby, Z., et al., "The Constrained Application Protocol (CoAP)", Internet Engineering Task Force (IETF) Request for Comments: 7252, Jun. 1, 2014, pp. 1-112, IETF.

Shelby, Z., et al., "CoRE Resource Directory", Internet-Draft, Dec. 11, 2013, pp. 1-28, IETF.

3rd Generation Partnership Project, "3rd Generation Partnership Project; Technical Specification Group Core Network and Terminals; Non-Access-Stratum (NAS) protocol for Evolved Packet System (EPS); Stage 3 (Release 12)", Technical Specification, 3GPP TS 24.301 V12.4.0, Mar. 1, 2014, pp. 1-362, 3GPP, France.

\* cited by examiner

COMMUNICATION CONFIGURATIONS FOR A MACHINE DEVICE

TECHNICAL FIELD

The invention relates to machine devices that communicate via communication networks. More particularly, the invention relates to a machine device and method, computer program and computer program product enabling configurations to be made for communication of a machine device in a communication network as well as to a configuration determining device and method, computer program and computer program product for providing configuration suggestions for communication of a machine device in a communication network.

BACKGROUND

Machine Devices (MDs) that are used in Internet of Things (IoT) scenarios often need to communicate with other hosts or cloud services at the Internet using a communication network such as a wide area network, like a wireless network, for instance in the form of a cellular network. The communication patterns and hence requirements for the wide area network capabilities vary considerably from one application to another.

A simple temperature sensor may for instance send small amounts of data every one hour or so, while a lock application may require an incoming signal a couple of times a day. A surveillance monitoring application may on the other hand constantly (or occasionally) send massive data streams from the MD to the Internet.

Network configurations are not usually static but they can be adjusted to provide different level of service (bandwidth, jitter, packet loss, etc.) or other functionality (e.g., how quickly is a device is (if at all) reachable from the Internet).

A conventional user terminal, often denoted user equipment (UE), is able to use various mechanisms towards the wireless communication network for configuring some functionality, such as Differentiated Services (DiffServ) signalling and $3^{rd}$ Generation Partnership Project (3GPP) network specific signalling. However, this functionality is not often available for general applications (e.g., Application Protocol Interfaces (APIs) are not available) and furthermore implementing such functionality on a resource constrained device (e.g. temperature sensor using a communication stack on microcontroller with only couple of kilobytes of Random Access Memory (RAM)) is not usually feasible due to lack of space for the protocol stack.

Current wireless communication networks do not expose suitable APIs for MDs to configure network features suitable for the applications.

Furthermore, MDs, especially ones with constrained resources and hence incapable of implementing plethora of communication methods, are ill-fitted to configure the network even if suitable protocols and APIs existed.

For instance, a cellular network may be capable of providing different service levels. Some of the levels may imply different tradeoffs for power usage and communications delay for MDs. Choosing the right tradeoff and service level is important to assure maximum battery life while fulfilling application requirements. However, configuring the underlying communications network may require the abovementioned APIs. More fundamentally, an MD (such as a sensor) may not possess the knowledge to determine what the system level application requirements and optimization possibilities are.

There is thus a need for providing differentiated communication configurations for machine devices based on the requirements placed on these machine devices.

SUMMARY

The invention is therefore directed towards automatically providing communication configurations for the communication performed by a machine device in a communication network.

This object is according to a first aspect achieved by a machine device for communicating in a communication network. The machine device comprises a processor acting on computer instructions whereby the machine device is configured to:

send a report to a configuration determining device associated with the communication network, which report sets out the type of services the machine device supports, and communicate in the communication network using communication configurations determined by the configuration determining device, where the communication configurations that are used have been determined based on the reported supported type of services.

The object is according to a second aspect achieved through a method of enabling configurations to be made for communication of a machine device in a communication network. The method is performed by the machine device and comprises:

sending a report to a configuration determining device associated with the communication network, which report sets out the type of services the machine device supports, and communicating in the communication network using communication configurations determined by the configuration determining device, where the communication configurations that are used have been determined by the communication determining device based on the reported supported type of services.

The object is according to a third aspect achieved through a computer program for enabling configurations to be made for communication of a machine device in a communication network. The computer program comprises computer program code which when run in the machine device, causes the machine device to:

send a report to a configuration determining device associated with the communication network, which report sets out the type of services the machine device supports, and communicate in the communication network using communication configurations determined by the configuration determining device, where the communication configurations that are used have been determined by the communication determining device based on the reported supported type of services.

The object is according to a fourth aspect achieved through a computer program product for enabling configurations to be made for communication of a machine device in a communication network. The computer program comprises a data medium with computer program code according to the third aspect.

In a first variation of the first aspect, the machine device is further configured to receive at least one communication configuration setting from the communication network.

In a corresponding variation of the second aspect, the method further comprises receiving at least one communication configuration setting from the wireless communication network.

In both above mentioned variations the received network configuration setting may comprise data identifying when the machine device is to be active and non-active in the communication network.

It is furthermore possible that the report is attached to control plane message between the machine device and a network node in the communication network, which message may be a constrained application protocol message.

The above-mentioned object is according to a fifth aspect also achieved by a configuration determining device for providing configuration suggestions for communication of a machine device in a communication network. The configuration determining device comprises a processor that acts on computer instructions whereby the configuration determining device is configured to:

receive a report submitted by the machine device, which report sets out the type of services supported by the machine device, determine communication configuration suggestions for the communication of the machine device in the communication network based on the supported type of services indicated in the report, and provide the communication configuration suggestions for allowing at least some of them to be implemented for use in communication performed by the machine device.

The object is according to a sixth aspect furthermore achieved by a method of providing configuration suggestions for communication of a machine device in a communication network. The method is performed by a configuration determining device and comprises:

receiving a report submitted by the machine device, which report sets out the type of services supported by the machine device, determining communication configuration suggestions for the communication of the machine device based on the supported type of services indicated in the report, and providing the communication configuration suggestions for allowing at least some of them to be implemented for use in communication performed by the machine device.

The object is according to a seventh aspect achieved by a computer program for providing configuration suggestions for communication of a machine device in a communication network. The computer program comprises computer program code which when run in a configuration determining device, causes the configuration determining device to:

receive a report submitted by the machine device, which report sets out the type of services supported by the machine device, determine communication configuration suggestions for the communication of the machine device based on the supported type of services indicated in the report, and provide the communication configuration suggestions for allowing at least some of them to be implemented for use in communication performed by the machine device.

The object is according to an eighth aspect achieved by a computer program product for providing configuration suggestions for communication of a machine device in a communication network. The computer program comprises a data medium with computer program code according to the seventh aspect.

The configuration determining device may be a resource directory.

In a first variation of the fifth and sixth aspects, the configuration determining device is in this case further configured to receive the report in a constrained application protocol message.

In another variation of the fifth aspect, the configuration determining device is further configured to obtain requirements by devices that subscribe to information in the configuration determining device and to determine the communication configuration suggestions for the machine device based also on such requirements.

In a corresponding variation of the sixth aspect, the method further comprises obtaining requirements by devices that subscribe to information in the configuration determining device and the determining of communication configuration suggestions for the machine device is based also on such requirements.

In a further variation of the fifth aspect, the configuration determining device when providing the communication configuration suggestions is further configured to send the communication configuration suggestions to network nodes of the communication network in order to allow at least some of them to be implemented.

In a corresponding variation of the sixth aspect, the providing of the communication configuration suggestions comprises sending the communication configuration suggestions to network nodes of the communication network in order to allow at least some of them to be implemented.

In yet another variation of the fifth aspect, the configuration determining device when providing the communication configuration suggestions is further configured to receive queries from network nodes regarding communication configuration suggestions for the machine device and respond with such communication configuration suggestions in order to allow at least some of them to be implemented.

In a corresponding variation of the sixth aspect, the providing of the communication configuration suggestions comprises receiving queries from network nodes regarding communication configuration suggestions of the machine device and responding with such communication configuration suggestions in order for the network nodes to have at least some of them implemented.

In yet a further variation of the fifth aspect, the configuration determining device is further configured to determine communication configuration suggestions for a number of machine devices that are registered to the configuration determining device, store communication configuration suggestions about all the registered machine devices and notify a network node responsible for handling communication of machine devices whenever a new machine device registers to the configuration determining device.

In a corresponding variation of the sixth aspect, the method further comprises determining communication configuration suggestions for a number of machine devices that are registered to the configuration determining device, storing communication configuration suggestions about all the registered machine devices and notifying a network node responsible for handling communication of machine devices whenever a new machine device registers to the configuration determining device.

According to a further variation of the fifth and sixth aspects, the determining of communication configuration suggestions is made using machine learning technique.

The report may comprise a functionality type description and associated metadata. It may also comprise a specification of supported media types. The report may further comprise data identifying the relationship between the machine device and a counterpart device with which it is communicating, such as if the machine device is acting as a client, a server or a peer. It may also comprise timing data specifying if data is to be transmitted periodically or not in communications involving the machine device. It is furthermore possible that the report comprises a setting defining if data is delay-tolerant or not.

The communication configuration suggestions and implemented communication configurations may in turn comprise quality of service level settings such as bandwidth, allowed jitter and packet loss. They may also comprise settings for the communication network to initiate the setting up of a communication channel between the machine device and the communication network before a scheduled transmission if the timing data indicates that data is to be periodically transmitted in communications involving the machine device. This setting may furthermore be accompanied by a setting of allowing the transmission time be shifted in case of network congestion, if data is delay tolerant.

The communication configuration suggestions and implemented communication configurations may furthermore comprise settings for setting up a communication channel triggered by the initiation of data transmission by the machine device in case it is acting as a client. They may also comprise settings for having a communication channel permanently set up between the machine device and the communication network in case the machine device is acting as a server and data is to be randomly transmitted to it.

The communication configuration suggestions and implemented communication configurations may of course also comprise the previously mentioned data identifying when the machine device is to be active and non-active in the communication network.

The invention has a number of advantages. Configurations may be made in and/or on behalf of the machine device based on information in the report. Thereby it is possible to automatically adapt to the individual type of requirements of the machine device on the wireless communication network, which is user-friendly. This way of implementing configurations is also possible to make for machine devices lacking user interfaces, as well as for constrained machine devices. This thus enhances the operability of a machine device without having to add extensive additional functionality. Furthermore this may be obtained with little extra effort, since such a report may already be present for other reasons.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns the provision of configurations for communication of a machine device in a communication network. The machine device may with advantage be a machine device provided for machine-to machine (M2M) communication, for instance used in Internet of Things (IoT). The machine device may more particularly be provided for communication with a server or some other counterpart device that receives data from or transmits data to the machine device, for instance in relation to an application provided by the machine device. Such communication is furthermore in this case made via a communication network, which communication network may be a wireless communication network.

A wireless communication network may as an example be a mobile communication network like a Long-Term Evolution (LTE), Universal Mobile Telecommunications System (UMTS) and Global System for Mobile Communications (GSM). The invention will be described below in relation to LTE. However, it may be used in other types of networks, such as UMTS, GSM, or CDMA2000, where CDMA is an acronym for Code Division Multiple Access. These are just a few examples of networks where the invention may be used. Another type of wireless network where the invention may be used is a Wireless Local Area Network (WLAN). A type of wired communication network where the invention may be used is a Local Area Network (LAN).

Figure 1:
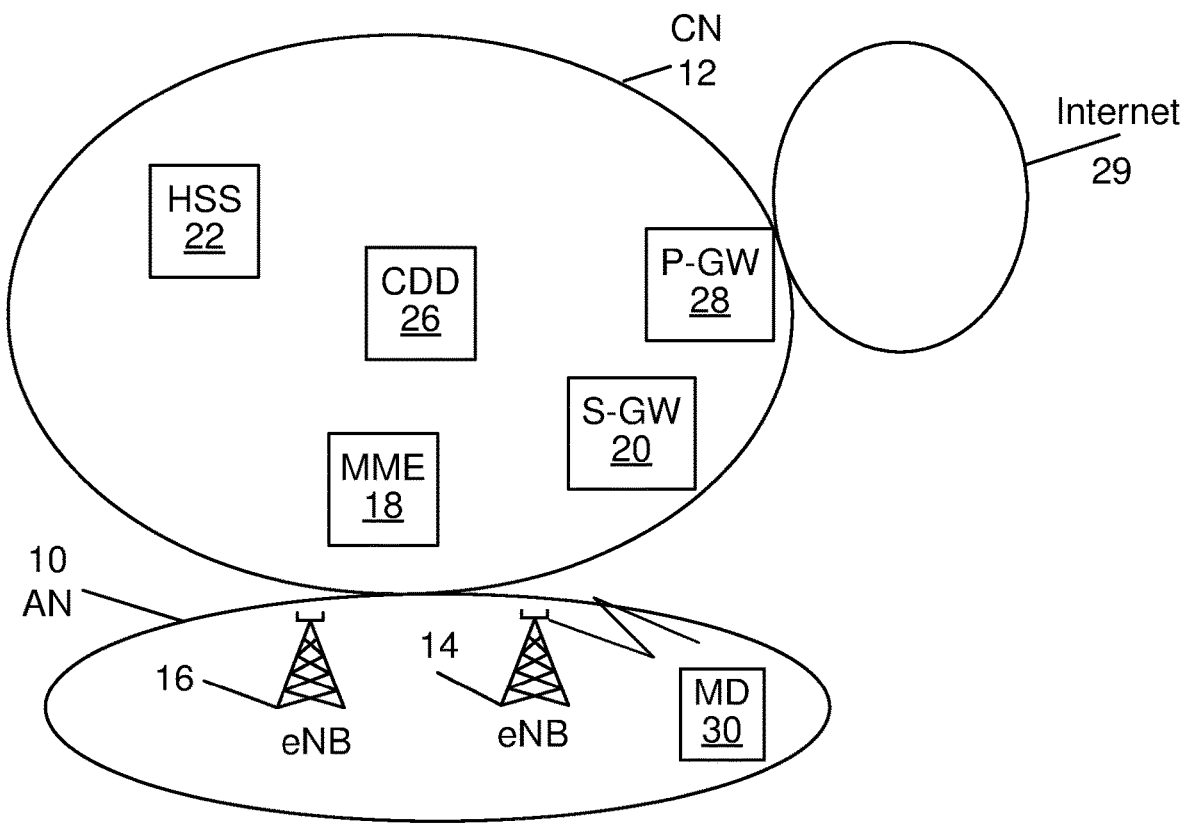
FIG. 1 schematically shows a machine device connected to a communication network comprising base stations, core network nodes as well as a configuration determining device.

FIG. 1 schematically shows a wireless communication network which may be a network according to any of the above described wireless types. The network may furthermore comprise an access network AN 10 and a core network CN 12, where the access network 10 comprises a number of nodes, which nodes are nodes where various devices get access to the wireless communication network. There is in this example a first base station 14 and a second base station 16, where a base station in LTE is often termed eNodeB or eNB. The core network 12 also comprises a number of network nodes. There is for example a Mobility Management Entity (MME) 18, a Serving Gateway (S-GW) 20, a Packet data network Gateway (P-GW) 28 and a Home Subscriber Server (HSS) 22, where the P-GW 28 is a gateway to other packet data networks such as the Internet. Therefore the P-GW 28 is shown adjacent such an external packet data network, which is indicated as being the Internet 29. In the core network 12 there is finally shown a configuration determining device (CDD) 26. The configuration determining device may as an example be provided in a machine type communication interworking function (MTC-ITW) node of the wireless communication network. The functioning of this device will be described in more detail later. However, one comment that may be made at this stage is that although it is shown as being a part of the wireless communication network and in this case of the core network 12, it should be realized that the configuration determining device 26 may be provided outside of the wireless communication network. It is however associated with the wireless communication network because it determines communication configurations that are to be used in this wireless communication network. It should also be realized that the configuration determining device 26 may also be provided as a part of another core network node, such as the MME 18.

There is finally a machine device MD 30, shown as being connected to the first base station 14.

In order to communicate with a counterpart device that is connected to the Internet 29, the machine device 30 may be communicating via a channel set up between itself and the counterpart device by the MME 18 through consulting the HSS 22. The channel would then be set up via the first base station 14, the S-GW 20, the P-GW 28 and the Internet 29. As an alternative it may be possible to communicate directly through the control plane. This means that communication with the counterpart device may be made via the MME 18 or some other control node instead of the S-GW 20 and P-GW 28.

Figure 2:
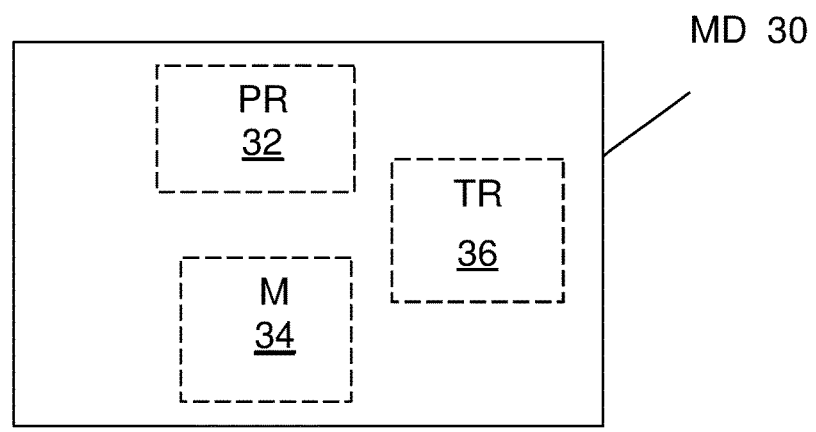
FIG. 2 shows a block schematic of a first realization of the machine device.

FIG. 2 shows a block schematic of a first way of realizing the machine device MD 30. The machine device 30 comprises a transceiver TR 36 set to communicate according to the wireless communication standard employed by the wireless communication network, which in this case is LTE. It also comprises a processor PR 32 connected to a program memory M 34. The program memory 34 may comprise a number of computer instructions implementing functionality of the machine device 30 related to enabling the provision of communication configurations for the machine device 30 and the processor 32 implements this functionality when acting on these instructions. It can thus be seen that the combination of processor 32 and memory 34 provides this functionality of enabling the provision of communication configurations for the machine device.

Figure 3:
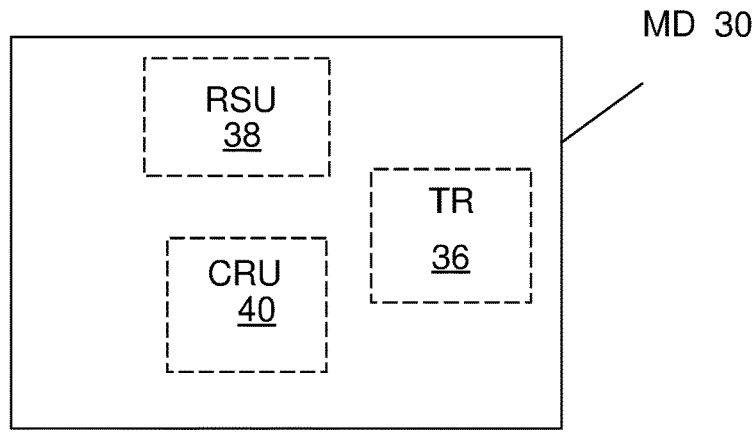
FIG. 3 shows a block schematic of a second realization of the machine device.

FIG. 3 shows a block schematic of a second way of realizing the machine device 30. The machine device 30 may comprise a report sending unit RSU 38 and optionally also a configuration receiving unit CRU 40 in addition to the transceiver 36. The report sending unit 38 and the configuration receiving unit 40 here perform the same functionality mentioned above in relation to the processor and memory related to enabling the provision of communication configurations.

The elements in FIG. 3 may be provided as software blocks for instance as software blocks in a program memory, but also as a part of dedicated special purpose circuits, such as Application Specific Integrated Circuits (ASICs) and Field-Programmable Gate Arrays (FPGAs). It is also possible to combine more than one element or block in such a circuit.

It should be realized that the machine device 30 would typically also comprise an activity unit, which is set to perform an activity related to an application implemented by the machine device 30, such as being a sensor sensing a physical property or an actuator set to actuate something in the environment of the machine device. However, the way such activities are carried out is not central to the various embodiments described herein and have therefore been omitted. It should also be realized that if the communication network is wireless, the transceiver would be a wireless transceiver.

Figure 4:
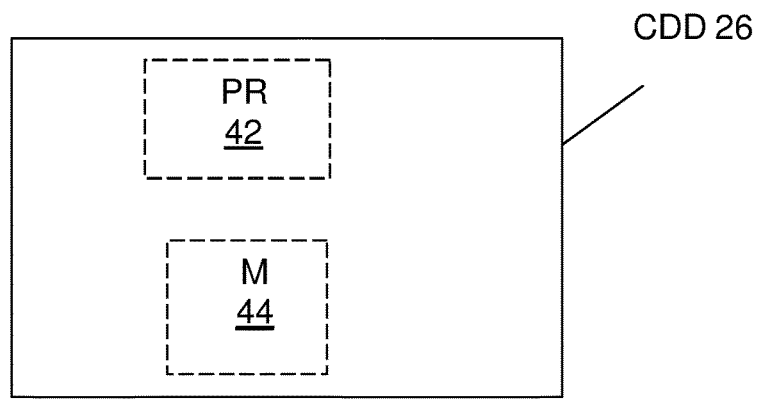
FIG. 4 shows a block schematic of a first realization of the configuration determining device.

FIG. 4 shows a block schematic of a first way of realizing the configuration determining device CDD 26. The configuration determining device 26 comprises a processor PR 42 connected to a program memory M 44. The program memory 44 may comprise a number of computer instructions implementing the functionality of the configuration determining device 26 and the processor 42 implements this functionality when acting on these instructions. It can thus be seen that the combination of processor 42 and memory 44 provides the configuration determining device 26.

Figure 5:
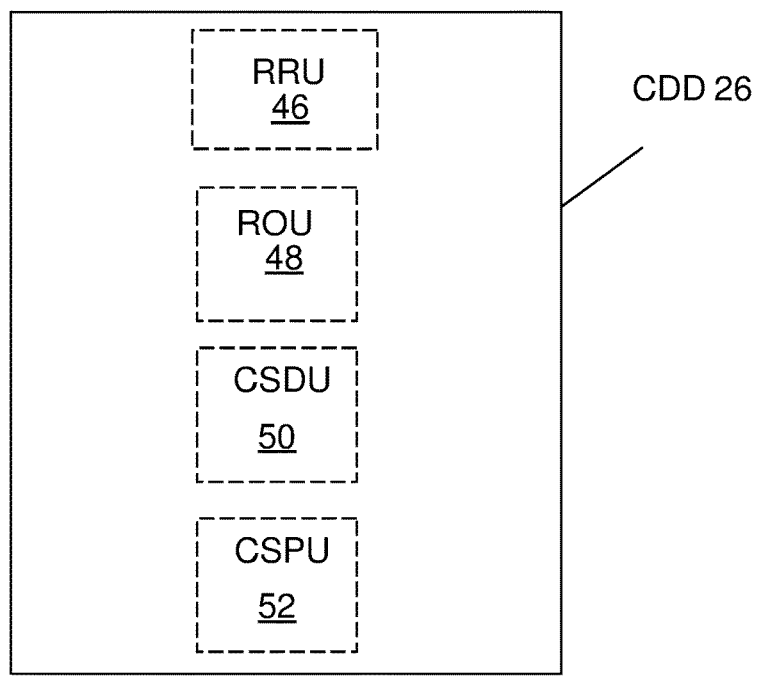
FIG. 5 shows a block schematic of a second realization of the configuration determining device.

FIG. 5 shows a block schematic of a second way of realizing the configuration determining device 26. The configuration determining device 26 may comprise a report receiving unit RRU 46, an optional requirement obtaining unit ROU 48, a configuration settings determining unit CSDU 50 and a configuration settings providing unit CSPU 52.

The elements in FIG. 5 may be provided as software blocks for instance as software blocks in a program memory, but also as a part of dedicated special purpose circuits, such as Application Specific Integrated Circuits (ASICs) and Field-Programmable Gate Arrays (FPGAs). It is also possible to combine more than one element or block in such a circuit.

As mentioned above, the machine device 30 may provide some type of functionality in relation to another device, a counterpart device, where the machine device 30 may as an example function as a sensor or an actuator. In this it may communicate with the counterpart device via the wireless communication network. The functionality can be of a wide range of functionalities ranging from frequent bandwidth intensive video communication to infrequent communication of small amounts of sensor measurements. There may also be a cyclic transfer of data or a random transfer of data.

The communication requirements on the communication network of a machine device may therefore vary considerably from device to device. There would in view of this be of interest to provide an automatic way of providing configurations for communication of a machine device in the communication network. There may exist a number of reasons for this, where one may be that it is physically hard to provide an interface via which a user may make settings that can be used for obtaining communication configurations. Some machine devices are furthermore resource constrained in that they do not have the resources to implement such an interface. Furthermore, it may be of interest to implement an automatic configuration even if the machine device has both the resources and is easily accessible. Such a reason may be because of user-friendliness. It is for instance conceivable that there is a system with a multitude of machine devices. The time and money saved by having an automatic configuration may be considerable.

Aspects of the invention address one or more of the above-mentioned issues.

Aspects of the invention address this through letting the machine device 30 send a report of its capabilities and preferences in the handling of data exchanged with the counterpart device with which it is communicating in relation to the application in the machine device 30. This report thus sets out the type of services supported by the machine device and is sent to the configuration determining device 26, which may act as a resource directory. Thereafter the configuration determining device 26 may provide nodes in the wireless communication network with configurations to be made in relation to the communication of the machine device 30. The nodes may be nodes via which communication takes place, such as S-GW 20 and a base station 14 as well as nodes responsible for the implementation of communication with regard to the machine device 30, such as the MME 18 and the HSS 22.

Figure 6:
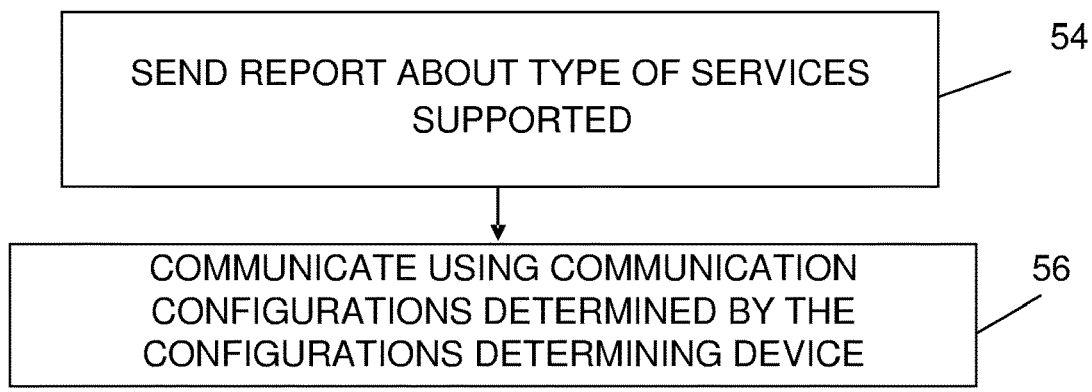
FIG. 6 shows a flow chart of a number of steps being performed by the machine device in a first embodiment of a method of enabling configurations to be made for communication of the machine device in the communication network.
Figure 7:
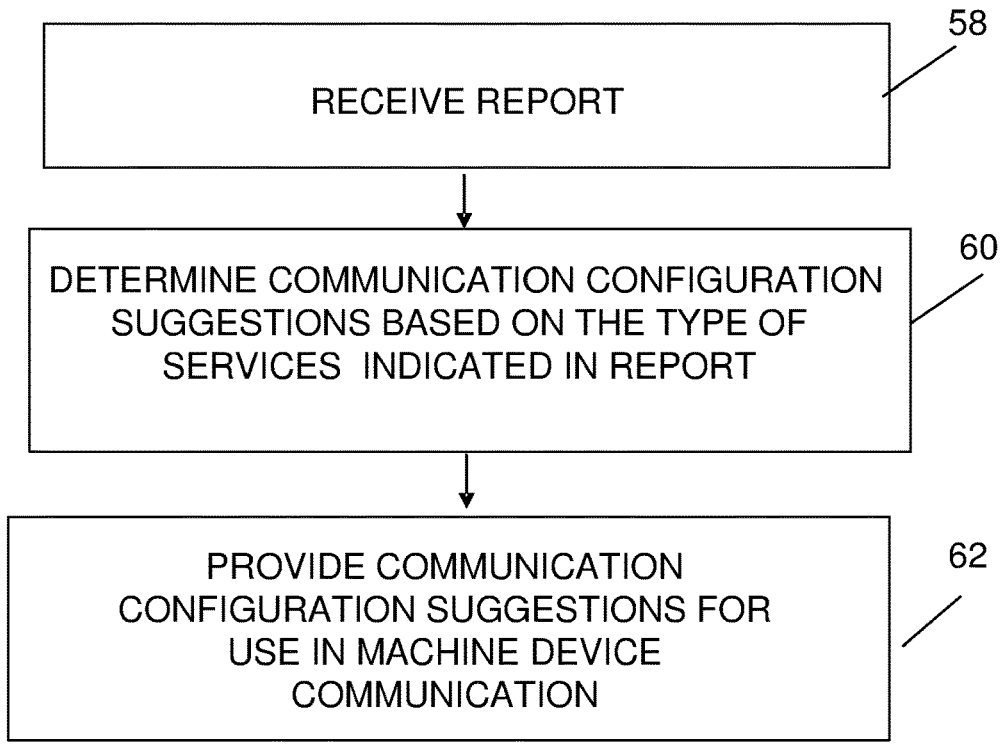
FIG. 7 shows a flow chart of a number of corresponding method steps being performed by the configuration determining device in a first embodiment of a method of providing configuration suggestions for communication of the machine device in the communication network.

A first embodiment will now be described with reference being made also to FIG. 6, which shows a flow chart of method steps being performed by the machine device 30 in a method of enabling configurations to be made for communication of the machine device 30 in the communication network and to FIG. 7, which shows a flow chart of a number of corresponding method steps being performed by the configuration determining device in a method of providing configuration suggestions for communication of the machine device 26 in the communication network.

The operation may start as the machine device 30 boots up and attaches to the wireless communication network, which attaching would be performed by the transceiver 36. Thereafter the report sending unit 38 connects to the transceiver 36 and sends a report to the configuration determining device 26 about the type of services supported by the machine device 30, step 54. The report is thus a report of the services it provides to a counterpart device with which it communicates via the wireless communication network, which communication may be made in relation to the application running in the machine device 30.

The report may comprise an interface description describing such services. The interface description may for instance be a Constrained REstful Environment interface type (CoRE if) description of the machine device resources. Such a description may comprise an identification of the functionality perhaps together with associated metadata about the functionality. It may also comprise information about used media types, i.e. the media types used in conveying of data to and from the machine device 30. Examples of possible media types are JavaScript Object Notation (JSON), Concise Binary Object Representation (CBOR), text/plain and video/H264. It is also possible to include further data such as timing data specifying if data is to be transmitted periodically or not in communications involving the machine device and the relationship between the machine device and the counterpart device, such as which of the machine device and counterpart device is to be in charge of data transfer, i.e. which is to be client, which is the be server or if they are peers. Such an interface description may exist in the machine device 30 in order to be reported to the above-mentioned counterpart device for enabling the exchange of data for the application running in the machine device 30.

Such interface data may be provided as a part of the functionality in the machine device 30 or rather defining the functionality with respect of communication with the counterpart device. If for instance the machine device 26 is a sensor, the interface description describes the communication with the counterpart device.

The report may more particularly be sent as a Constrained Application protocol (CoAP) message intended for the configuration determining device 26 that acts as a resource directory.

There are a number of different ways in which this message may be transferred. In case the machine device 30 has not yet been assigned a communication identifier, such as an Internet Protocol (IP) address, the report may be attached to a control plane message between the machine device 30 and a network node in the wireless communication network. It may for instance be piggybacked in a Non-Access Stratum (NAS) layer message between the machine device 30 and the MME 18. It may for instance be sent as a part of or in parallel with a Service Request NAS procedure. The MME 18 may in turn be aware of which device in the wireless communication network that is a resource directory and therefore forward the message to the communication configuration device 26. As an alternative the machine device 30 may, in case it has been assigned a communication identifier, directly connect to the configuration determining device 26 and send the report. In this latter case it is possible that the sending of the report is preceded by a discovery phase, where the machine device 26 discovers the configuration determining device 26. Alternatively it may already possess information required to connect to the configuration determining device 26, such as if it has a fixed IP address.

The report is then received by the report receiving unit 46 of the configuration determining device 26, step 58, wherefrom it is forwarded to the configuration settings determining unit 50. Optionally the requirement obtaining unit 48 may receive or obtain requirements by devices that subscribe to information held by the configuration determining device 26. Such requirements may then also be forwarded to the configuration settings determining unit 50.

After the configuration settings determining unit 50 has received this information, it then determines suggestions of configurations for the communication of the machine device 30 based on the supported type of services defined by the interface description in the report and optionally also the above-mentioned requirements, step 60.

It is for instance possible to infer from the application type information if data of a machine device requires a high bandwidth or not. Also the supported media types may assist in such a determination as may the type of role of the machine device and any timing parameters. The configuration suggestions that are determined may comprise a level of quality of service (QoS) settings, such as bandwidth, jitter and allowed packet loss. Other possible configuration suggestions comprise Discontinuous Reception (DRX) settings or paging cycle lengths and paging occasions as well as coverage enhancement settings. If the location and path loss of the machine device is known it is also possible to set coverage enhancement operation, such as simultaneous communication via two base stations.

Once these configuration suggestions have been determined, the communication configuration suggestions are provided for allowing at least some of them to be implemented for used in communication performed by the machine device, step 62. This may involve the configuration settings providing unit 52 providing suggestions of various communication configurations to relevant network nodes of the wireless communication network, which may implement one or more of these suggestions. It is thus possible that all the suggestions are implemented, thereby making them mandatory. It is also possible that only some of them are implemented. The wireless communication network may for instance consider the communication requirements of other entities communicating in the wireless communication network, such as user equipment, and such considerations may make some configuration suggestions unsuitable.

It is possible that the configuration settings providing unit 52 sends the configuration suggestions to the network nodes that the machine device communicates with, i.e. nodes that are used in the forming of communication links for the machine device 30, such as the S-GW 20 and the first base station 14. It may also inform nodes that are responsible for the communication of the machine device 30 in the wireless communication network, such as the MME 18 and the HSS 22, which nodes then apply the one or more of the suggestions for the nodes used in the communication links. As an alternative it is possible that the configuration settings providing unit 52 announces the configuration suggestions to the network nodes, which may then query the configuration determining device 26 for suggestions for instance based upon need. The configuration determining device 26 may thus receive queries from network nodes regarding communication configuration suggestions for the machine device and respond with such communication configuration suggestions in order to have one or more of them implemented. Typically QoS, paging cycle length and paging occasion settings may be provided to the MME 18 and/or the S-GW 20, while DRX may be transmitted to the first base station 14.

In case the configuration determining device 26 is provided in a core network node handling communication of the machine device, such as the MME, it may itself implement some of the configuration suggestions.

Thereafter some of the configurations may be transferred to the machine device 30. The configuration receiving unit 40 of the machine device 30 may therefore receive at least one communication configuration setting from the wireless communication network and thereafter apply it on communication performed via the wireless transceiver 36. An example of such a setting is a DRX setting, which setting identifies when the machine device 30 is to be active and non-active in the wireless communication network, e.g. listening for paging messages and sleeping. The DRX setting is used by the transceiver 36. Other of the configurations may be retained in the wireless communication network for being applied for or on behalf of the machine device 30 in the wireless communication network when transmission of data takes place.

Thereafter the machine device 30 communicates with the wireless communication network using communication configurations that have been determined by the configurations determining device 26, step 56, which communication configurations are those configurations that have been suggested by the configurations determining device and implemented in the communication network. The communication may involve sleeping/being active according to the received DRX settings. It may also involve communicating with the counterpart device, which communication may be made via the first base station 14, the S-GW 20, the P-GW 28 and the Internet 29. In these communications the S-GW 20 and perhaps also the first base station 14 may also apply configurations being based on suggestions determined for the machine device 30 by the configuration determining device 26.

It can in this way be seen that configurations are made in and/or on behalf of the machine device 30 based on the interface settings included in the report. Thereby it is possible to automatically adapt to the individual type of requirements of the machine device 26 on the wireless communication network, which is user-friendly. This way of implementing configurations is also possible to make for machine devices lacking user interfaces, as well as for constrained machine devices. This thus enhances the operability of a machine device without having to add extensive additional functionality.

In some cases the same functionality used by the machine device for announcing its capabilities may also be used for making network configurations. A CoAP message is for instance normally sent to a Resource Directory when a machine device registers its resources. The resource registration can thus be combined with making communication configurations for the machine device.

Figure 9:
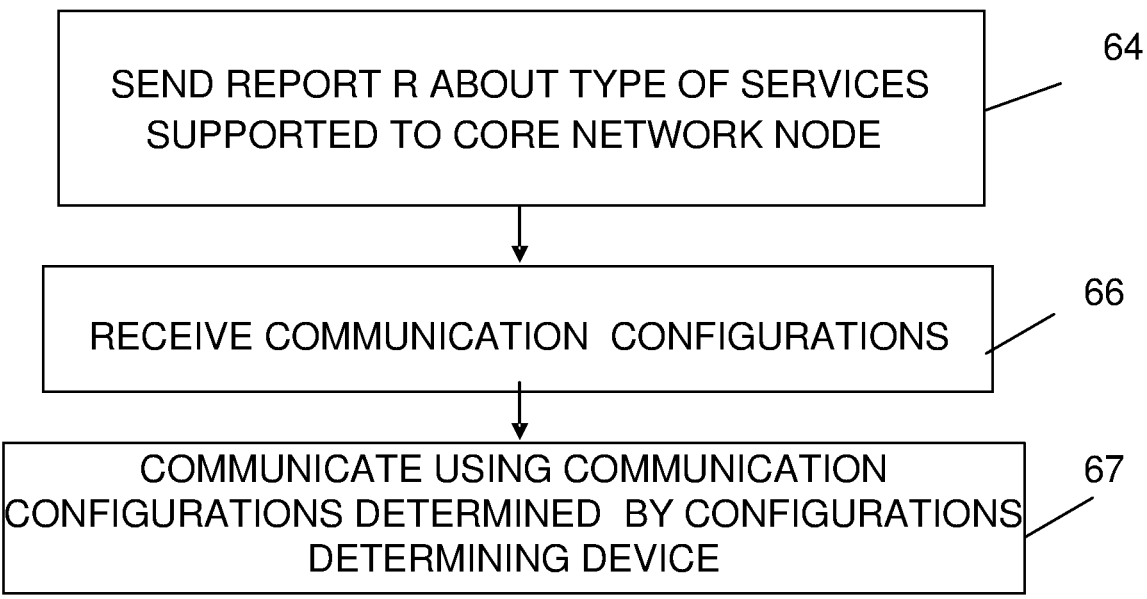
FIG. 9 shows a flow chart of a number of method steps performed by the machine device in a second embodiment of the method of enabling configurations to be made for communication of the machine device in the communication network, FIG. 10 schematically shows a flow chart of a number of method steps performed by the configuration determining device in a second embodiment of the corresponding method of providing configuration suggestions for communication of the machine device in the communication network.
Figure 10:
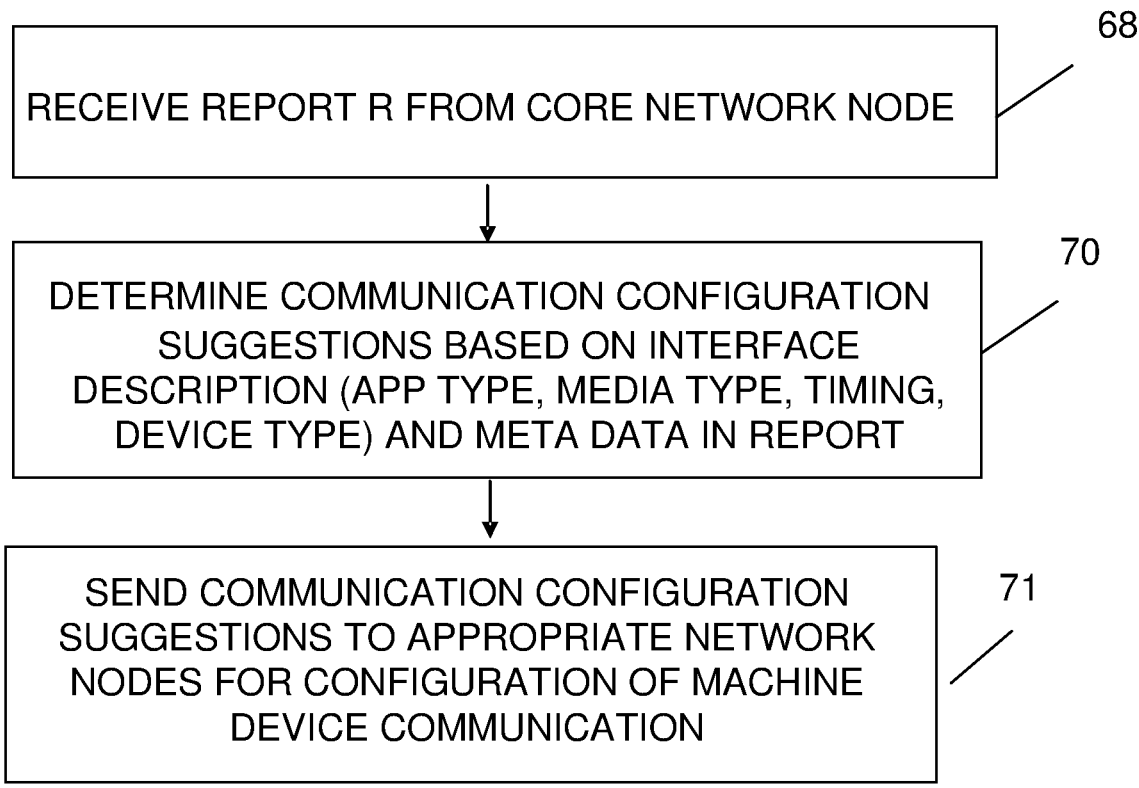

Now a second embodiment will be described with reference being made to FIG. 8, which shows an example of data present in a report, FIG. 9, which shows a flow chart of a number of method steps performed by the machine device in the method of enabling configurations to be made for communication of the machine device in the communication network, and FIG. 10, which schematically shows a flow chart of a number of method steps performed by the configuration determining device in the corresponding method of providing communication configuration suggestions for communication of the machine device in the communication network.

Figure 8:
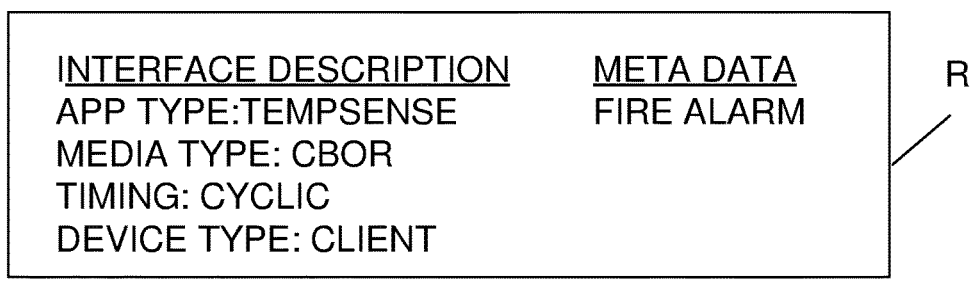
FIG. 8 shows an example of data present in a report of machine device capabilities.

FIG. 8 shows an exemplifying report R, where the interface description comprises a functionality type description, for instance in the form of a description of application type, APP TYPE, associated metadata, a specification, MEDIA TYPE, of media types supported by the machine device, type of timing, TIMING, specifying if data is to be transmitted periodically or not in communications involving the machine device 30 and type of role, DEVICE TYPE, of the machine device, e.g. if it is acting as a client or a server. In the example in FIG. 8, the application type is a temperature sensing application, identified by the name tempsense and the metadata indicates that the temperature is used for a fire alarm. The media type is indicated as being Concise Binary Object Representation (CBOR), which is a media type suitable for conveying sensor values in concise form, the timing is shown as being cyclic and the role as being a client, which in turn means that the counterpart device would be a server.

Also in this second embodiment the configuration determining device 26 is a resource directory.

Furthermore, in this second embodiment, the report sending unit 38 of the machine device 30 sends the report R to a core network node, step 64. It may as an example send the report as a CoAP message attached to a NAS service request to the MME 18. The core network node, for instance the MME 18, may in this case be aware of the fact that the configuration determining device 26 is a resource directory and therefore forwards the report R to the configuration determining device 26, which forwarding may thus involve forwarding a CoAP message comprising the report R.

The report R is then received from the core network node by the report receiving unit 46 of the configuration determining device 26, step 68, wherefrom it is forwarded to the configuration settings determining unit 50.

In this embodiment the requirement obtaining unit 48 is not used.

After the configuration settings determining unit 50 has received this information, it then determines communication configuration suggestions for the machine device 30 based on the interface description and metadata in the report R, step 60. It more particularly determines some suggestions of configuration settings that are to be applied.

The configuration settings determining unit 50 may for instance investigate the application name, metadata and supported media types and determine a suggestion of the QoS level based on these. In the example of the report R in FIG. 8, it is for instance possible to see that the required bandwidth would be low because of the use of the CBOR media type for temperature measurements. The fact that the temperature measurements are to be used for a fire alarm in turn indicates that the allowed delay and packet loss should be low. This information could also be used for implementing coverage enhancement, if the machine device has the ability.

Here it should be realized that another decision could have been made with regard to allowed packet loss and coverage enhancement if the metadata was different, for instance if it indicated that the temperature sensing is related to the tracking of weather temperatures. If the application is of another type, such as a video surveillance application using the media type video/H264, then the required bandwidth would instead be high.

The indication that the reporting is cyclic may, if also the period of the cycle is known, in turn be used to make DRX settings and paging period settings. That the reporting is cyclic and the machine device 30 is a client may furthermore be used for making channel settings, such as Packet Data Protocol (PDP) contexts for the S-GW 20.

With regard to the timing, there may be an additional setting that data is delay-tolerant. For example there could be periodic transmissions but if the data would be delay tolerant it would not matter if it is not transmitted exactly per schedule but could wait for later transmission opportunities. This could be used for adjusting transmission, for instance for avoiding transmissions, when there is high load in the system or for some other reason.

When the timing setting is that reporting is cyclic, i.e. transmitted periodically, in communications involving the machine device then it is furthermore possible that the suggested communication settings comprise settings for the wireless communication network to initiate the setting up of a communication channel between the machine device 30 and the wireless communication network before a scheduled transmission according to the cycle is to be made. This may be done irrespective of if the machine device is a server or a client. In case the machine device is a client, the communication configuration suggestions may comprise suggested settings for setting up a communication channel triggered by the initiation of data transmission by the machine device 30. This means that the communication of data by the application in the machine device 30 may in turn cause or trigger the setup of the channel or PDP context, irrespective of if there is timing or not, i.e. irrespective of if reporting is cyclic or random. However, if there is no timing, i.e. data is sent randomly and the machine device is acting as a server then the communication configuration suggestions may comprise suggestions of settings for having a communication channel permanently set up between the machine device 30 and the wireless communication network.

It can in the example of FIG. 8 be seen that it is possible to have a channel set up just before the transfer of data or triggered by the machine device initiating sending of data. What suggestion is selected in this case may depend on how fast the sensor measurement is needed by the counterpart device. In the case of a fire alarm, speed may be of essence, why a channel set up prior to the initiation of data transfer may be selected.

The selections of suggested setting parameters may as an example be made using machine learning techniques.

Once the settings have been determined, the communication configuration suggestions are sent to the relevant network nodes of the wireless communication network by the configuration settings providing unit 52, step 71. The various configuration setting suggestions are thus distributed. Suggestions for channel setup settings and quality of service may for instance be sent to the MME 18 and/or S-GW 20, while suggested DRX settings may be sent to the first base station 14 for implementation in the machine device 3.

Some of the suggested settings may thus be transferred to the machine device 30 for being implemented there. Examples of such settings are DRX settings. Other of the configuration suggestions may be retained in the wireless communication network for being applied for the machine device 30 in the wireless communication network when communication takes place. In this way one or more of the suggested configurations may be implemented in the wireless communication network and machine device 30.

The configuration receiving unit 40 of the machine device 30 thereby receives possible communication configurations, such as DRX settings, step 66, and thereafter applies them on the transceiver 36. This is then followed by the machine device 30 communicating in the wireless communication network using the communication configurations determined by the configurations determining device 26, step 67. These communication configurations are more particularly the configuration suggestions that are implemented in the communication network. The communicating using the determined communication configurations may involve the machine device 26 sleeping/being active according to the received DRX settings. It may also involve communicating with the counterpart device, which communication would typically be made via the first base station 14, the S-GW 20, the P-GW 28 and the Internet 29. In these communications the S-GW 20 and perhaps also the first base station 14 may apply configurations such as QoS setting and PDP context settings being determined by the configuration determining device 26.

Thereby the communication between the machine device and the counterpart device is adapted to the requirements of the application of the machine device. This will in turn lead to a more efficient wireless communication network use.

There are a number of variations that are possible to make of the above described embodiments. It is for instance possible to also use the requirement obtaining unit in the determining of communication configurations in the second embodiment.

Another possible variation of both the first and the second embodiment is that the configuration determining device may act as a resource directory for all machine devices communicating in the wireless communication network. In this case it is also possible that the configuration determining device is implemented in a different node than the MTC-ITW node. In this case it may be implemented as a separate node, which may be another CoAP server. In this case it is also possible that an MTC-ITW node is notified every time a new machine device registers with the configuration determining device. The configuration determining device may furthermore determine communication configuration suggestions for a number of machine devices that are registered to the configuration determining device, store communication configuration suggestions about all the registered machine devices and notify a network node responsible for handling communication with machine devices, e.g. MTC-ITW, whenever a new machine devices registers to the configuration determining device. It is in fact possible that any user of the registered capabilities or resources of a machine device may provide information about application requirements, which may be advantageous when determining delay and timeliness settings.

The configuration determining device 26 may also be provided outside of the wireless communication network, for instance in the premises of an operator of the machine device. This may be the same location where the counterpart device is located. In this case the machine device 30 may send the report via the user plane with CoAP over IP, i.e. over a channel such as a PDP context set up for the machine device in the wireless communication network. The configuration suggestions may then be announced by the configuration determining device to the network nodes of the wireless communication network using a suitable announcing functionality. Alternatively the configuration suggestions may be sent to a node in the wireless communication network, such as the HSS, which may then ensure that one or more of the configuration suggestions are applied for the machine device in the wireless communication network.

Figure 11:
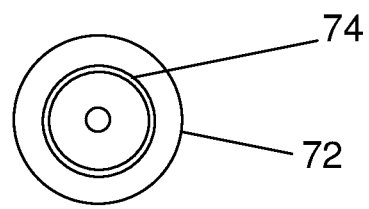
FIG. 11 shows a computer program product comprising a data carrier with computer program code for implementing functionality of the machine device.

The computer program code of the machine device may be in the form of computer program product for instance in the form of a storage medium, such as a CD ROM disc or a memory stick. In this case the storage medium carries a computer program with the computer program code, which will implement the above-described functionality of the machine device. One such storage medium 72 with computer program code 74 is schematically shown in FIG. 11.

Figure 12:
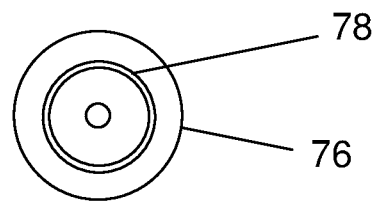
FIG. 12 shows a computer program product comprising a data carrier with computer program code for implementing functionality of the configuration determining device.

In a similar manner the computer program code of the configuration determining device may be in the form of computer program product for instance in the form of a storage medium, such as a CD ROM disc or a memory stick. In this case the storage medium carries a computer program with the computer program code, which will implement the above-described configuration determining device. One such storage medium 76 with computer program code 78 is schematically shown in FIG. 12.

The report sending unit of the machine device may be seen as means for sending a report setting out the type of services it supports to a configuration determining device associated with the communication network, while the transceiver may be seen as means for communicating in the communication network using communication configurations determined by the configuration determining device.

The configuration receiving unit of the machine device may in turn be seen as means for receiving at least one communication configuration setting from the communication network.

The report receiving unit of the configuration determining device may be seen a means for receiving a report submitted by the machine device setting out the type of services supported by the machine device. The configuration settings determining unit may be seen as means for determine communication configuration suggestions for the communication of the machine device in the communication network based on the supported type of services indicated in the report and the configuration settings providing unit may be seen as means for providing communication configuration suggestions for allowing at least some of them to be implemented for use in communication performed by the machine device.

The requirement obtaining unit of the configuration determining device may in turn be seen as means for obtaining requirements by devices that subscribe to information in the configuration determining device and the means for determining communication configuration suggestions may in this case also be means for determining the communication configuration suggestions for the machine device based also on such requirements.

The means for providing communication configuration suggestions may comprise means for sending communication configuration suggestions to network nodes of the communication network.

The means for providing communication configuration suggestions may comprise means for receiving queries from network nodes regarding communication configuration suggestions for the machine device and means for responding with such communication configuration suggestions in order to allow at least some of them to be implemented.

The means for determining communication configuration suggestions may comprise means for determining communication configuration suggestions for a number of machine devices that are registered to the configuration determining device. In this case the configuration determining device may also comprise means for storing communication configuration suggestions about all the registered machine devices and means for notifying a network node responsible for handling communication of machine devices whenever a new machine device registers to the configuration determining device.

The means for determining communication configuration suggestions may finally comprise means for using machine learning techniques when determining communication configuration suggestions.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A configuration determining device for providing configuration suggestions for communication of a machine device in a communication network, the configuration determining device comprising:
 processing circuitry;
 memory containing instructions executable by the processing circuitry whereby the configuration determining device is operative to:
  act as a resource directory;
  receive a Constrained Application Protocol (CoAP) message submitted by the machine device, the CoAP message comprising a report setting out the type of services supported by the machine device;
  in response to receiving the CoAP message, determine communication configuration suggestions for the communication of the machine device in the communication network based on the supported type of services indicated in the report; and
  provide the communication configuration suggestions for allowing at least some of the communication configuration suggestions to be implemented for use in communication performed by the machine device.

2. The configuration determining device of claim 1, wherein the report comprises timing data specifying if data is to be transmitted periodically or not in communications involving the machine device.

3. The configuration determining device of claim 2, wherein the communication configuration suggestions comprise settings for the communication network to initiate the setting up of a communication channel between the machine device and the communication network before a scheduled transmission if the timing data indicates that data is to be periodically transmitted in communications involving the machine device.

4. The configuration determining device of claim 1, wherein the instructions are such that the configuration determining device is operative to:
   obtain requirements by devices that subscribe to information in the configuration determining device; and
   determine the communication configuration suggestions for the machine device based also on such requirements.

5. The configuration determining device of claim 1, wherein the instructions are such that the configuration determining device is operative, when providing the communication configuration suggestions, to send the communication configuration suggestions to network nodes of the communication network in order to allow at least some of the communication configuration suggestions to be implemented.

6. The configuration determining device of claim 1, wherein the instructions are such that the configuration determining device is operative, when providing the communication configuration suggestions, to receive queries from network nodes regarding communication configuration suggestions for the machine device and respond with such communication configuration suggestions in order to allow at least some of the communication configuration suggestions to be implemented.

7. A configuration determining device for providing configuration suggestions for communication of a machine device in a communication network, the configuration determining device comprising:
   processing circuitry;
   memory containing instructions executable by the processing circuitry whereby the configuration determining device is operative to:
      receive a report submitted by the machine device setting out the type of services supported by the machine device;
      determine communication configuration suggestions for the communication of the machine device in the communication network based on the supported type of services indicated in the report; and
      provide the communication configuration suggestions for allowing at least some of the communication configuration suggestions to be implemented for use in communication performed by the machine device;
      determine communication configuration suggestions for a number of machine devices that are registered to the configuration determining device;
      store communication configuration suggestions about all the registered machine devices; and
      notify a network node responsible for handling communication of machine devices whenever a new machine device registers to the configuration determining device.

8. A method of providing configuration suggestions for communication of a machine device in a communication network, the method comprising a configuration determining device:
   acting as a resource directory;
   receiving a Constrained Application Protocol (CoAP) message submitted by the machine device, the CoAP message comprising a report setting out the type of services supported by the machine device;
   in response to receiving the CoAP message, determining communication configuration suggestions for the communication of the machine device based on the supported type of services indicated in the report, and
   providing the communication configuration suggestions for allowing at least some of the communication configuration suggestions to be implemented for used in communication performed by the machine device.

9. The method of claim 8:
   further comprising obtaining requirements by devices that subscribe to information in the configuration determining device; and
   wherein the determining of communication configuration suggestions for the machine device is based also on such requirements.

10. The method of claim 8, wherein the providing of the communication configuration suggestions comprises sending the communication configuration suggestions to network nodes of the communication network in order to allow at least some of the communication configuration suggestions to be implemented.

11. The method of claim 8, wherein the providing of the communication configuration suggestions comprises:
   receiving queries from network nodes regarding communication configuration suggestions of the machine device; and
   responding with such communication configuration suggestions in order for the network nodes to have at least some of the communication configuration suggestions implemented.

12. A method of providing configuration suggestions for communication of a machine device in a communication network, the method comprising a configuration determining device:
   receiving a report submitted by the machine device setting out the type of services supported by the machine device;
   determining communication configuration suggestions for the communication of the machine device based on the supported type of services indicated in the report;
   providing the communication configuration suggestions for allowing at least some of the communication configuration suggestions to be implemented for used in communication performed by the machine device;
   determining communication configuration suggestions for a number of machine devices that are registered to the configuration determining device;
   storing communication configuration suggestions about all the registered machine devices; and
   notifying a network node responsible for handling communication of machine devices whenever a new machine device registers to the configuration determining device.

* * * * *